Aug. 17, 1943.      B. S. AIKMAN      2,326,911
FLUID PRESSURE CONTROL MECHANISM
Filed June 7, 1941      2 Sheets-Sheet 2
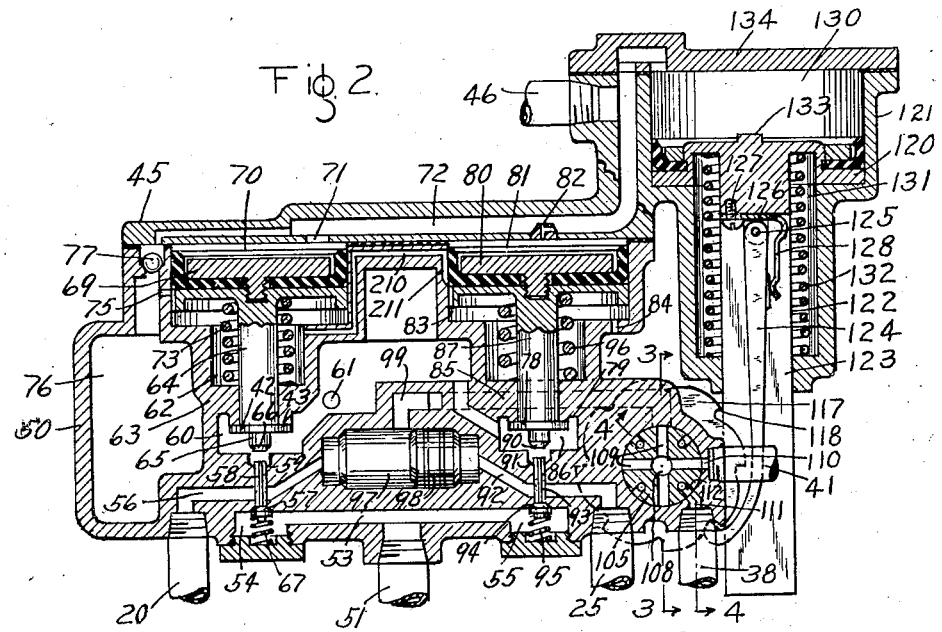
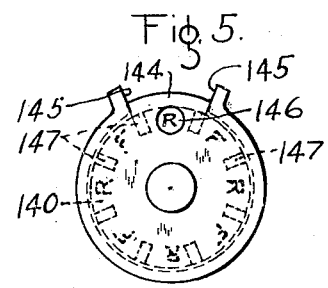
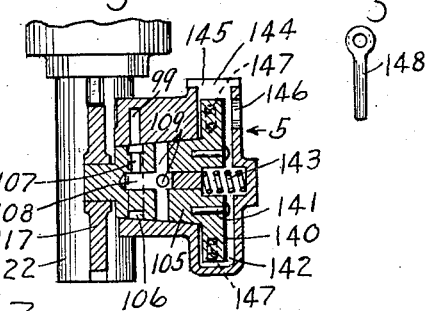
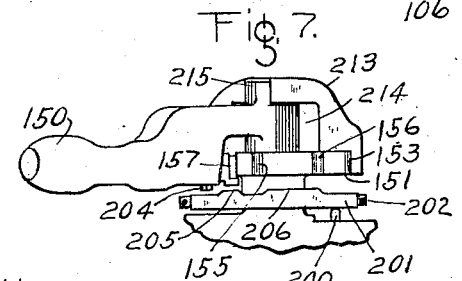
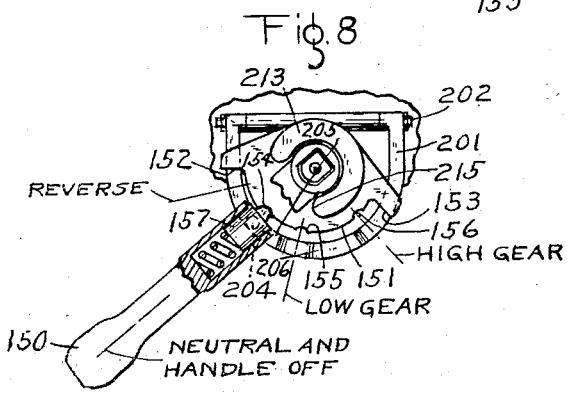
INVENTOR
BURTON S. AIKMAN
BY R. M. Higgins
ATTORNEY Patented Aug. 17, 1943

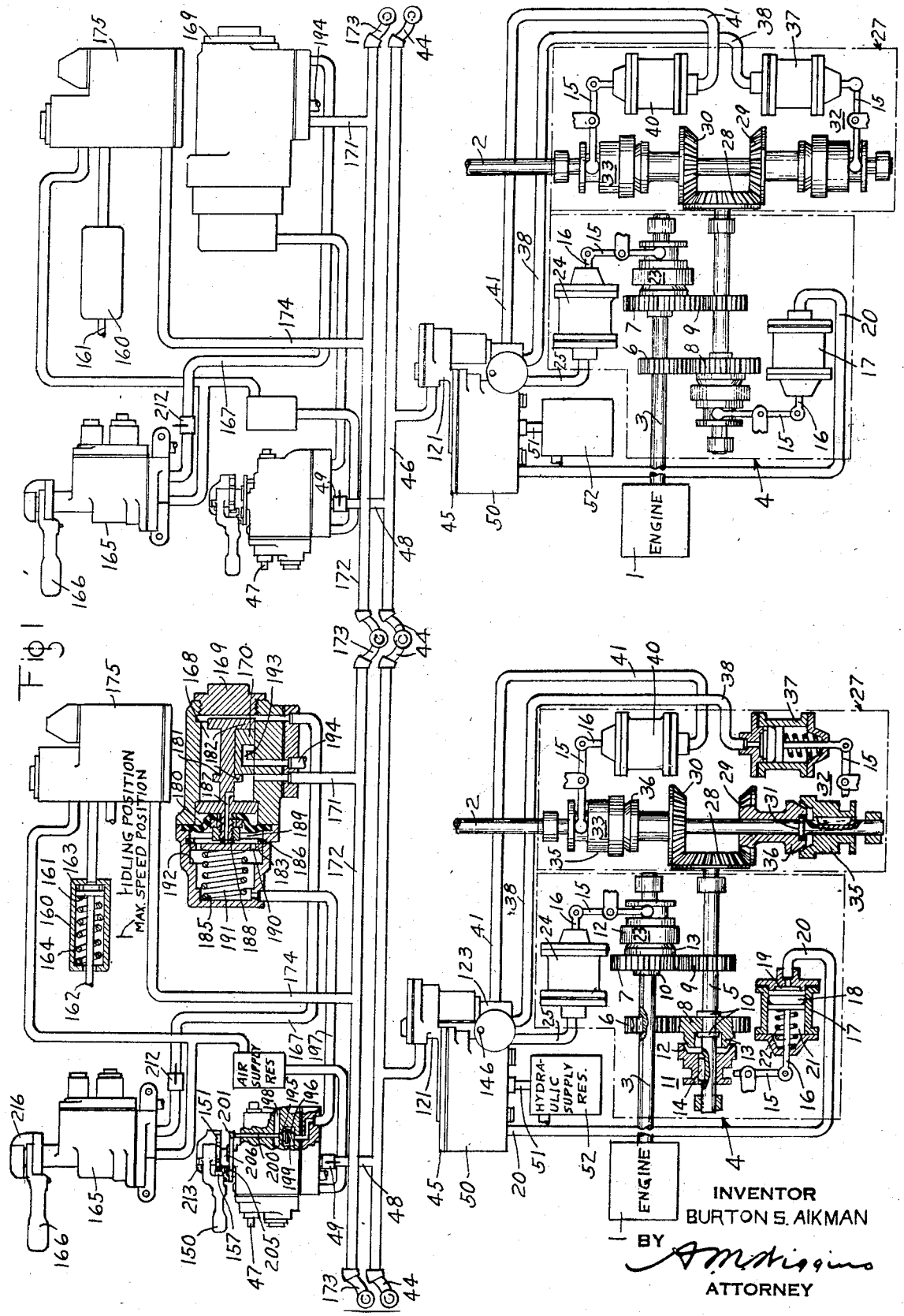

2,326,911

UNITED STATES PATENT OFFICE 2,326,911

FLUID PRESSURE CONTROL MECHANISM

Burton S. Aikman, Wilkinsburg, Pa., assignor to The Westinghouse Air Brake Company, Wilmerding, Pa., a corporation of Pennsylvania Application June 7, 1941, Serial No. 397,018

45 Claims. (Cl. 192—.01)

This invention relates to fluid pressure control mechanism and more particularly to a mechanism for selectively controlling the operation of a plurality of devices.

Certain railway vehicles propelled by internal combustion engines, particularly of the Diesel type, are provided with a power transmission system connecting the engine to the drive wheels which includes, in addition to a suitable disconnecting clutch such as the fluid type, a selective, directional forward and reverse control and a selective high and low gear transmission to provide different speed ratios between the engine and drive wheels. The selection of these different drive arrangements is obtained by the engagement and disengagement of suitable clutches, that is, a clutch is engaged to provide for forward movement of the vehicle and a different clutch is engaged to provide for reverse movement, while with either of these clutches engaged another clutch is adapted to be engaged to provide a low gear drive for starting the vehicle while still a fourth clutch is adapted to be engaged to provide a high gear drive. All of these clutches are controlled hydraulically, being engaged when subject to hydraulic pressure and disengaged when the hydraulic pressure is relieved. It will be apparent then that when the forward clutch or low gear clutch is engaged, the reverse clutch and high gear clutch must be disengaged, and vice versa.

One object of the invention is the provision of an improved control system for selectively controlling the operation of a plurality of devices such as the forward and reverse and high and low gear clutches just described.

Another object of the invention is the provision of a pneumatic system particularly adapted to provide for remote, selective control of a plurality of devices such as the clutches just described.

Another object of the invention is the provision of improved means for remotely controlling the position of the throttle of the propelling engine on a vehicle.

At the time of changing a drive gear between the engine and drive wheels of the vehicle or of changing the direction of vehicle movement, it is desirable that the engine be operating at idling speed; and still another object of the invention is therefore the provision of means adapted to operate automatically to cause the speed of the engine to reduce to idling at the time of changing any one of the speed change gear clutches or of the forward and reverse clutches and after such change has been effected to automatically increase the speed of the engine to that existing before initiating such change.

Other objects and advantages will be apparent from the following more detailed description of the invention.

In the accompanying drawings; Fig. 1 is a diagrammatic view, partly in section and partly in outline, of the improved clutch and throttle control system, shown applied to two coupled power vehicles or locomotives and arranged to be controlled by the operator on the leading locomotive, which it will be assumed is at the left-hand side of the drawing; Fig. 2 is a vertical sectional view of a selector valve device shown in elevation in Fig. 1; Figs. 3 and 4 are sectional views taken on the lines 3—3 and 4—4, respectively, in Fig. 2; Fig. 5 is a view taken in the direction of the arrow 5 in Fig. 3; Fig. 6 is a plan view of an adjusting key; Fig. 7 is an enlarged side view of the top portion of a manually operative control device shown in Fig. 1; and Fig. 8 is a plan view of said manually operative control device with certain parts broken away to show detailed structure.

Description

Referring first to Fig. 1, the reference numeral 1 indicates a propulsion engine for a vehicle which is adapted to apply power to a driving axle 2 extending transversely of the vehicle and connected at opposite ends to drive wheels (not shown). For transmitting power from the engine 1 to axle 2, said engine is adapted to be connected through a suitable clutch (not shown) to a primary drive shaft 3, which extends into a speed change transmission device 4. A secondary drive shaft 5 is mounted in this device at one side of shaft 3 and extends parallel thereto. The shaft 3 is provided with a relatively small gear 6 and a relatively large gear 7 which are in constant mesh with gears 8 and 9 respectively mounted on the secondary drive shaft 5, the meshing gears 6 and 8 providing for speed reduction and thus constituting a low gear drive between the two shafts while the meshing gears 7 and 9 provide for speed increasing and thus constitute a high gear drive between said shafts.

Both of the smaller gears 6 and 9 are keyed to their respective shafts for rotation therewith, while the larger gears 7 and 8 are journaled on their shafts between two spaced collars 10 which are adapted to hold the gears against longitudinal movement.

At one side of gear 8 is a low gear clutch 11 comprising a movable clutch element 12 slidably mounted on the shaft 5 and a fixed clutch element 13 which is associated with the gear 8. A key 14 secures the clutch element 12 to the shaft 5 for rotation therewith and provides for movement of said element relative to said shaft into and out of driving contact with the fixed element 13 on gear 8. When these parts are disengaged as shown in the drawing the gear 8 is adapted to idle on the secondary drive shaft 5, but when engaged, power applied to said gear from the smaller gear 6 on the primary shaft 3 is adapted to effect rotation of the secondary shaft 5 through the clutch 11.

For controlling the low gear clutch 11 there is provided a conventional shifting lever 15 connected at one end to the movable clutch element 12 and at the opposite end to one end of a rod 16 projecting from a hydraulically controlled low gear cylinder 17. This cylinder comprises a casing containing a piston 18 having at one side a pressure chamber 19 connected to a low gear control pipe 20 through which liquid under pressure is adapted to be supplied to said chamber and released therefrom by means to be hereinafter described. The piston 18 has at the opposite side a non-pressure chamber 21 and the rod 16 extends through this chamber and is connected to the piston 18. A clutch disengaging spring 22 is provided in chamber 21 for acting on piston 18 to move same to the position shown upon the release of hydraulic pressure in chamber 19 for releasing the low gear clutch 11.

A high gear clutch 23 is provided for connecting and disconnecting shaft 3 to and from gear 7. This clutch may be identical to clutch 11 and be controlled through the medium of a shifting lever 15 and rod 16 from a high speed hydraulic control cylinder 24 like the cylinder 17 but adapted to be controlled through the medium of a high gear control 25.

It will be noted that when the low speed hydraulic cylinder 17 is subjected to hydraulic pressure and the high speed cylinder 23 is relieved of hydraulic pressure, power will be transmitted from the primary drive shaft 3 to the secondary drive shaft 5 through the gears 6 and 8 which constitute a low gear or high torque drive connection between the engine and drive axle 2 intended for use in starting the vehicle. When the cylinder 17 is relieved of hydraulic pressure and the cylinder 23 is subject to hydraulic pressure, power will be transmitted from the primary drive shaft 3 to the secondary drive shaft 5 through gears 7 and 9, which constitute a relatively low torque and high gear connection adapted to be used for driving the vehicle after its speed has been increased to above a certain degree by use of the low gear drive just described.

The secondary drive shaft 5 extends into a selective forward and reverse directional control device 27 and therein is provided with a bevel gear 28 which is in constant mesh with two oppositely disposed bevel gears 29 and 30 which are journaled on the drive axle 2 and which are held in mesh with gear 28 and against longitudinal movement on said drive shaft by suitable collars 31. In the embodiment the gear 29 will be considered as providing for forward movement of the vehicle while the gear 30 is adapted to provide reverse movement.

Accordingly a forward clutch 32 is provided for connecting and disconnecting gear 29 with the axle 2, while a reverse clutch 33 is associated with the gear 30 for the same purpose. Each of the clutches 32 and 33 comprises a movable clutch element 35 like the element 11 and slidably mounted on axle 2 and which is adapted to cooperate with a projecting clutch portion 36 of the adjacent gear to provide a drive connection therebetween and said axle. The forward clutch 32 for the gear 29 is adapted to be engaged by hydraulic pressure applied to a forward control cylinder 37 and transmitted therefrom through shifting lever 15, while said clutch is adapted to be released upon the release of hydraulic pressure in said cylinder, the pressure in said cylinder being controlled through the medium of a forward control pipe 38. The reverse clutch 33 for gear 30 is adapted to be controlled in a similar manner by a reverse control cylinder 40 connected to a reverse control pipe 41.

From the above description it will now be noted that when hydraulic pressure is applied to the forward control cylinder 37, movement of the vehicle in a forward direction will be provided for, while when hydraulic pressure is applied to the reverse cylinder 40 movement of the vehicle in reverse will be provided for and it will also be noted that when one of these cylinders is under pressure the other must be relieved of pressure. It will be further noted that for both directions of vehicle movement the operation of the low and high speed gear cylinders 17 and 24 in the speed change transmission device 4 will provide both a low gear and high gear drive connection between the engine 1 and axle 2.

It is desired to point out that the gear and clutch control arrangement shown in the transmission device 4 and the structure of the forward and reverse directional control device 27 are merely diagrammatic in form and are employed for illustrative purposes only.

According to the invention a selector valve 45 is provided for selectively controlling through the medium of pipes 20, 25, 38 and 41 the operation of the several clutch control cylinders 17, 24, 37 and 40, respectively, to select the drive ratio between the engine 1 and vehicle axle 2 and also the direction of vehicle movement. The selector valve 45 in turn is adapted to be controlled by variations in fluid pressure in a control pipe 46 extending from one end of the vehicle to the opposite end. Both ends of pipe 46 are provided with suitable connectors 44 for connection with a like pipe on a coupled vehicle so that the selector devices 45 on two coupled vehicles may operate in unison to provide the same directional control and speed drive connection between the engines and axles of the two vehicles. For in turn controlling the pressure variations in the control pipe 46, each vehicle is provided with a manually operative controller 47 which is connected to the control pipe 46 through a branch pipe 48. A cut-out cock 49 is provided in pipe 48 for disconnecting the control pipe 46 from the controller 47 which is not being used, that is, the controller on the second vehicle for instance when two vehicles are coupled together and adapted to be controlled from the leading vehicle.

The selector valve 45 comprises a casing section 50 to which all of the pipes 20, 25, 38 and 41 above mentioned are connected. To the casing section 50 is also connected a pipe 51 leading from a hydraulic supply reservoir 52 which is adapted to be maintained charged at all times with a liquid, such as oil, under pressure.

The hydraulic supply pipe 51 is connected to a passage 53 in the casing section 50 which leads to two valve chambers 54 and 55. The pipe 20 is open to a passage 56 and in chamber 54 is a valve 57 having a fluted stem 58 extending through passage 56 and past a valve seat 59 into a chamber 60 which is open through a release outlet 61 to an oil sump (not shown).

The chamber 60 is separated from a chamber 62 by a partition wall 63 through which there is provided a bore in coaxial relation with the valve stem 58 and connecting said chambers. A piston stem 64 has a neat sliding fit in this bore and projecting from the end of this stem into chamber 60 is a portion 65 of reduced diameter having on its end a tapered valve 66 for engaging the valve seat 59. Above the valve 66 the stem 64 is provided with a valve 42 adapted to engage a seat 43.

When the piston stem 64 occupies the position shown, the valve 42 is adapted to be seated, and the valve 66 unseated under which condition the valve 57 is adapted to be seated by the pressure of a spring 67. When the valve 66 is moved into engagement with the seat 59, such movement is adapted to act through the fluted stem 58 to unseat the valve 57.

The chamber 62 is open at its upper end to an enlarged bore containing a piston 69 which is connected to the stem 64. At the upper face of piston 69 is a chamber 70 which is open through a port 71 to a control passage 72. A coil spring 73 encircling rod 64 in chamber 62 is supported at one end on partition wall 63 and bears at the opposite end on piston 69 for urging said piston upwardly to the position shown. The pressure of spring 73 on piston 64 is such as to require an increase in fluid pressure to a chosen degree in chamber 70, such for instance as thirty-five pounds, for moving the piston downwardly to seat valve 66 and unseat valve 57.

In the upper position of piston 69 a port 75 is open to chamber 62 below the piston, this port being constantly in communication with a timing reservoir 76 which may be open to the control passage 72 by way of a check valve 77. This check valve is arranged to permit flow of fluid in the direction from the timing reservoir to passage 72 but to prevent flow in the opposite direction. The port 75 is arranged so that movement of piston 69 in a downwardly direction will lap same.

Disposed at one side of the piston 69 is a similar piston 80 having at its upper face a chamber 81 which is open to the control passage 72 through a choke 82. At the lower face of piston 80 is a chamber 83 which is open to the atmosphere through a breather port 84, and projecting from the piston through this chamber and a partition wall 85 into a chamber 86 is a piston stem 87. A valve 78 is provided on stem 87 to engage a seat 79 when the parts are in the position shown.

A valve 90 is provided on the end of piston stem 87 in chamber 86 and is adapted to cooperate with a valve seat 91 upon downward movement of piston 80 for closing communication between a passage 92 open to pipe 25 and chamber 86. Projecting through passage 92 and valve seat 91 is the fluted stem 93 of a poppet valve 94 contained in chamber 55. The valve 90 upon movement into engagement with seat 91 is adapted to act through the valve stem 93 to unseat the valve 94 to thereby establish communication between the oil supply passage 53 and passage 92. Upon unseating of valve 90 a spring 95 is adapted to seat the valve 94.

Encircling the piston stem 87 in chamber 83 is a coil spring 96 supported at one end on the partition 85 and bearing against said piston. This spring is of such value as to require an increase in fluid pressure in chamber 81 on the piston 80 to a degree such as sixty-five pounds for effecting movement of the piston to its lower position.

The two passages 56 and 92 lead to the opposite ends of a chamber 97 containing a double check valve 98 which is operative to control communication between these passages and an outlet passage 99 which opens to said chamber intermediate the ends thereof. When liquid under pressure is supplied past the valve 57 to passage 56 a portion of the liquid is adapted to flow to chamber 97 and move the double check valve 98 to the position shown for thereby closing communication between the passage 99 and the passage 92 and for opening passage 99 to passage 56. When liquid under pressure is supplied to passage 92 upon unseating of valve 94 the double check valve 98 is adapted to be moved thereby to an opposite position for closing communication between passages 99 and 56 and for connecting the passage 99 to passage 92.

A tapered plug valve 105 is mounted to turn in a suitable tapered bore provided in the casing section 50 beyond the connection with pipe 25. This valve is provided around its periphery adjacent its smaller end with an annular groove 106 in permanent communication with one end of passage 99 leading to the double check valve chamber 97. The groove 106 is connected by a radial passage 107, shown in Fig. 3, to an axial passage 108 leading to four radial bores 109 which are equally spaced apart and open at the peripheral surface of the valve.

The reverse control pipe 41 is open through a passage 110 to the seating face of the plug valve in such a location that one or another of the radial bores 109 will register therewith upon rotation of the valve in its bore. The forward control pipe 38 is also open through a passage 111 to the seating face of the plug valve in the same radial plane as the passage 110 but spaced forty five degrees therefrom. Between each two radial bores 109 the plug valve has another radial bore 112 so located as to register with either passage 110 or passage 111 upon turning of the plug valve in its seat. Each bore 112 is open to a port 113 extending longitudinally of the valve and through the larger end thereof to atmosphere.

It will be noted that the four radial passages 109 are spaced ninety degrees from each other and the four intermediate radial passages 112 are also spaced ninety degrees from each other and forty five degrees from the ports 109, so that when one of either set of passages is open to pipe 38 one of the other set of passages will be open to the pipe 41 and it will be further noted that the connections between these passages and pipes will be reversed upon each forty five degrees of rotation of the plug valve in its seat.

For turning the plug valve in its seat a one-way acting clutch is provided which comprises a ratchet wheel 117 secured to the smaller end of the valve and having eight equally spaced ratchet teeth 118, this number of teeth corresponding to the combined number of radial bores 112 and 109 in the plug valve.

For operating the ratchet wheel 117 a piston 120 is provided in a casing section 121 a portion of which constitutes a cover for chambers 70 and 81 above the pistons 69 and 80, respectively. The piston 120 has a stem 122 depending therefrom along one side of and at right angles to the axis of the plug valve 105. This stem is provided with a longitudinally extending slot 123 and is so arranged that the ratchet teeth 118 on the wheel 117 are adapted to turn through said slot. A pawl 124 is rockably mounted on a pin 125 which is carried in a bracket 126 secured against the upper closed end of the slot 123 by a screw 127. The lower hook shaped end of the pawl 124 is aligned to move over the periphery of the ratchet wheel. A leaf spring 128 associated with the bracket 126 acts on pawl 124 for urging same into engagement with the ratchet wheel 117. It will be noted that the ratchet wheel 117 extending into the slot 123 cooperates with the stem 122 to secure said stem against turning so as to thereby maintain the pawl 124 in operating alignment with the teeth 118 on the ratchet wheel 117.

The piston 120 has at its upper face a pressure chamber 130 which is open to the fluid pressure control passage 72. At the lower side of piston 120 is a chamber 131 which is in constant communication with the atmosphere through the slot 123 in the stem 122 and which contains a coil spring 132 acting on the piston urging it in an upwardly direction. The pressure of this spring on the piston is such that an increase in fluid pressure in chamber 130 to a certain degree such as ten pounds is required to urge the piston to its lower position shown. When the pressure in chamber 130 is of a lower degree, the spring 132 is adapted to urge the piston 120 to an upper position defined by contact between an extension 133 of the piston and a cover 134 which is secured to the casing section 121 for closing the upper open end of said chamber.

The degree of movement of piston 120 from the position shown to its upper position just mentioned is adapted through the operation of pawl 124 to effect rotation of the plug valve 105 through an angle of forty five degrees to thereby reverse the connection of pipes 38 and 41 with the radial bores 109 and 112 in said valve.

A disk 140 is secured to the larger end of the plug valve 105 in any suitable manner as by rivets 141. This disk is adapted to turn with the plug valve in a pocket 142 provided in an extension of the casing section 50. Between the outer end wall of this pocket and the plug valve is interposed a spring 143 acting on said valve for maintaining it against its seat.

The upper end of the pocket 142 is provided with an opening 144 of a slightly greater circumferential length than forty five degrees and at either end of said opening is a shoulder 145. In the outer end wall of pocket 142 a window 146 is provided substantially mid-way between the shoulders 145 and the disk 140 on its outer face eight equally spaced legends R and F which stand respectively for forward and reverse direction of movement of the vehicle and which are arranged alternately and adapted to pass behind this window as the plug valve is turned. One of these legends is adapted to coincide with window 146 in each of the eight different operating positions of the plug valve and the legend which is visible is intended to indicate the direction of vehicle movement as determined by the position of the plug valve 105 and which of the control cylinders 37 and 40 in the forward and reverse control device 30 is arranged to be effective.

Mid-way between each R and F on disk 140 is a radial bore opening at the edge of the disk. The two bores 147 at either side of the R or F visible through the window 146 are adapted to be open past the shoulders 145 to space 144 so that a key 148, shown in Fig. 6 may be inserted in the bore at the right-hand end of the opening 144 and then manually moved to the opposite end of said opening for turning the plug valve to a desired position for reversing the connections through the plug valve to the clutch control cylinders 37 and 40 in the forward and reverse directional control device 30, under a condition which will be later described.

The control passage 72 is connected to pipe 46 which extends from one end to the other of the vehicle and which is connected by the branch pipe 48 to the manually operative controller 47 whereby through the medium of said controller the selective operation of the pistons 120, 80 and 69 in the selector device 45 and thereby the selective operation of the several control cylinders and clutches in the speed change transmission device 4 and forward and reverse directional control device 27 may be effected.

The control of these several devices is dependent upon the establishment of different degrees of fluid pressure in the control pipe 46 and the controller 47 may therefore be of any desired type which will provide and maintain such pressures in said pipe. Preferably however, the controller 47 is of the type which will vary the pressure in pipe 46 in accordance with the angular position of a manually operative control handle 150 from a normal or neutral position. A device of this type is fully disclosed in Patent 1,939,907 issued to E. K. Lynn on December 19, 1933 and since reference may be had to this patent a further description of the fluid pressure control portion of this device is not deemed essential.

As shown in Figs. 7 and 8 the handle 150 is adapted to be turned over a quadrant 151 from a position in engagement with a shoulder 152 at one end of the quadrant to a position in engagement with a shoulder 153 at the opposite end of the quadrant. In the peripheral face of the quadrant there are provided three notches 154, 155 and 156 and in the handle there is a spring pressed detent 157 adapted to ride the edge of the quadrant and to enter one or another of these notches for defining different selected intermediate positions of the handle.

When the handle is in contact with shoulder 152 the controller 47 is adapted to effect complete venting of fluid under pressure from the control pipe 46. This position is to be used only when it is desired to operate the plug valve 105 to change the direction of vehicle movement, and may therefore be called reverse position. When the handle is in the position shown in Fig. 8, defined by detent 157 entering notch 154 the controller 47 is adapted to establish and maintain a desired pressure, such as fifteen pounds, in the control pipe 46. This position may be called neutral and handle-off position and is adapted to be used for causing disengagement of both of the clutches 11 and 23 in the speed change transmission device 4. When the handle 150 is in the position defined by the detent 157 entering notch 155 the controller 47 is adapted to establish and maintain a chosen pressure such as thirty five pounds in the control pipe 46 for rendering the low gear clutch 11 effective. This position may therefore be called the low gear position. When in the position defined by the detent entering notch 156 and in which the handle also engages shoulder 153 the controller is adapted to establish and maintain a higher chosen pressure such as sixty five pounds in the control pipe 46 for rendering the high gear clutch 23 effective and this position may therefore be called the high gear position.

The reference numeral 160 indicates a throttle control cylinder for the engine 1. This cylinder comprises a casing containing a piston 161 and a rod 162 projecting from the piston and operatively connected by any suitable means (not shown) to the throttle of the engine 1. The piston 161 has at one side a pressure chamber 163 to which fluid under pressure is adapted to be supplied for effecting movement of said piston in the direction of the left-hand against the opposing pressure of a control spring 164 for causing acceleration of the engine 1, the degree of acceleration depending upon the position of the piston 161 in its cylinder which in turn is determined by the pressure of spring 164 in accordance with the pressure of fluid supplied to chamber 163. The piston may therefore have an idling position as indicated and be movable to any selected position between the idling and maximum speed position, also indicated on the drawing, for providing any desired degree of speed or power of engine 1.

For remotely controlling the position of the throttle piston 161 a manually operative throttle control valve device 165 is provided. This device may be generally similar to the manually operative controller 47 in that it comprises valve means (not shown) conditionable by a handle 166 for supplying fluid to a control pipe 167 at a pressure which varies in accordance with the degree of angular movement of the handle from a normal position.

The pipe 167 is in constant communication with valve chamber 168 of an interlock valve device 169. This device comprises a slide valve 170 disposed in the chamber 168 and having a normal position shown for connecting said chamber to a pipe 171 leading to a throttle control pipe 172 which extends from end to end of the vehicle for connection with a similar control pipe of a connected vehicle, in case of double heading, by means of suitable connectors 173. The pipe 172 is connected by a branch pipe 174 to a relay valve device 175 and this device is adapted to respond to pressure variations in the pipe 172, as effected by operation of the manually operative throttle control valve device 165, to provide corresponding variations in pressure in chamber 163 of the throttle control device 160 to thereby adjust the throttle and speed or power of engine 1 in accordance with the position of the handle 166.

Relay valve devices are also well known and since reference may be had to Patent 2,096,491 issued to Ellis E. Hewitt on October 19, 1937, which discloses in detail the relay valve device 175, a further description and showing thereof are not deemed essential in the present application.

The interlock valve device 169 further comprises a flexible diaphragm 180 which is clamped around its periphery and operatively connected at its center to a stem 181 disposed in the valve chamber 168. The slide valve 170 is mounted between spaced shoulders 182 on the stem 181 for movement therewith. At the opposite side of the diaphragm 180 is a spring seat 183 slidably mounted in a suitable guide in the casing and engaging one end of the stem 180. Between the opposite face of seat 183 and the closed end of the casing is interposed a spring 185 for urging said seat and thereby the diaphragm 180, stem 181, and slide valve 170 to their normal positions shown, this position of the spring seat being defined by contact with a shoulder 186 in the casing.

The stem 181 is provided with a restricted port 187 connecting the valve chamber 168 to a groove 188 provided across the end of the stem adjacent the spring seat 183 for supplying fluid under pressure at a restricted rate from said chamber to a chamber 189 at the opposite side of the diaphragm and from thence through openings 190 in the spring seat 183 to a chamber 191 which contains the spring 185.

When through port 187 the fluid pressures on opposite sides of the diaphragm 180 are equalized the spring 185 is adapted to maintain the parts of the interlock valve device 169 in the position shown for connecting the relay valve device 175 to the throttle control pipe 172. When fluid pressure is vented from chambers 189 and 191, in a manner to be later described, the fluid pressure in chamber 168 is adapted to effect movement of the diaphragm 180 in the direction of the lefthand until the spring seat 183 contacts a shoulder 192 in which position the slide valve 170 will close communication between valve chamber 168 and pipe 171 and connect said pipe through a cavity 193 in the slide valve to an exhaust pipe 194 for thereby suddenly releasing the actuating fluid in the relay valve device 175 for causing operation thereof to vent the fluid under pressure from the throttle control piston chamber 163 so that the throttle cylinder piston 161 will operate to reduce the speed of engine 1 to idling.

The pressure of fluid in chambers 191 and 189 in the interlock valve device 169 is adapted to be controlled by a poppet valve 195 located in the manual controller 47. This poppet valve is contained in a chamber 196 which is in constant communication through pipe 197 with chamber 191 in the interlock valve device and controls communication between said chamber and an atmospheric exhaust port 198. A spring 199 in chamber 196 is provided for urging the valve 195 to its normal seated position to permit equalization of pressures on the opposite sides of the diaphragm 180 so that spring 185 may position the parts of the interlock valve device as shown in the drawings.

The poppet valve 195 has a stem 200 which extends through the casing and terminates below a substantially semi-circular bail 201 disposed under the operating handle 150. This bail is fulcrumed at opposite ends on a shaft 202 secured in the casing and, as viewed in Figs. 7 and 8, it will be apparent that the handle 150 is adapted to move over the upper surface of the bail in movement between its extreme position.

A button 204 projects from the lower side of the handle 150 in alignment with the upper surface of the bail 201 and the bail is provided with a raised part 205 adapted to be engaged by said button as the handle is moved from the neutral position to the low gear drive position indicated in Fig. 8 for rocking the bail in a downwardly direction. Another raised part 206 is provided on the bail for engagement by the button 204 as the handle is moved from low gear drive position to high gear drive position for also rocking the bail in a downwardly direction. In each of the operating positions of the handle 150 indicated in Fig. 8 the button 204 is adapted to be disposed either between or beyond the raised portions of the bail so that the bail may occupy the normal position shown.

Movement of the bail 201 in a downwardly direction by engagement of button 204 with either of the raised parts 205 and 206 is adapted to act through the stem 200 to unseat the poppet valve 195 for thereby venting fluid under pressure from chambers 191 and 189 in the interlock valve device to the atmosphere through the exhaust port 198. The capacity of this vent communication so exceeds the capacity of the restricted port 187 in the interlock stem 181 as to create a differential in the pressures on the diaphragm 180, when chamber 168 is charged, to effect movement thereof and thereby of slide valve 170 to their left-hand positions hereinbefore mentioned.

*Operation—Single vehicle*

Let it be assumed that handle 166 of the throttle control valve device 165 is in the engine idling position shown opening the control pipe 167 to the atmosphere. As a result valve chamber 168 in the interlock valve device 169 will be vented and spring 185 will be rendered operative to hold the diaphragm 180 and slide valve 170 in said device in the normal positions shown thereby venting the engine throttle control pipe 172 and branch pipe 174 connected with the relay valve device 175 to the atmosphere through the valve chamber 168 and thence by way of pipe 167. With pipe 174 leading to the relay valve device 175 vented, said device will vent piston chamber 163 in the throttle control cylinder 160 in order that spring 164 in said cylinder will position the piston 161 and thereby the throttle control rod 162 in the engine idling position shown. The engine 1 will therefore operate at an idling speed.

Let it further be assumed that handle 150 of the controller 47 is in the neutral position indicated in Fig. 8 to thereby provide the desired constant pressure of for instance fifteen pounds in the control pipe 46 connected to the selector valve device 45. The pistons 69 and 80 in the selector valve device will therefore be in their upper positions shown due to the greater opposing forces of springs 73 and 96, respectively. With the piston 69 in its upper position the valve 66 will be opened and the valve 57 will be closed so that the low gear control cylinder 17 will be opened past the valve 66 to the sump passage 61 and the low gear clutch 11 therefore disengaged.

With piston 80 in the selector valve device in its upper position shown in the drawings, the valve 94 is seated and valve 90 unseated so that the high gear clutch control cylinder 24 is also open to the sump passage 61 and the high gear clutch 23 disengaged, as a result. With both clutches 11 and 23 in the transmission device 4 thus disengaged and with the engine 1 idling and turning the primary drive shaft 3, the low speed gear 8 will merely idle on the secondary drive shaft 5 while the primary drive shaft will merely turn in the high speed gear 7 under which condition the secondary drive shaft 5 will be stationary as well as the drive axle 2 of the vehicle.

The fifteen pounds pressure provided in the control pipe 46 and acting in chamber 130 on the direction selector piston 120 will move same to the lower position shown due to the fact that only ten pounds pressure is required in said chamber to overcome spring 132. With piston 120 in this position the pawl 124, ratchet wheel 117 and plug valve 105 will also be occupying the positions shown, in which a legend R on disk 140 will be seen through the window 146, as seen in Fig. 5, indicating the plug valve is in condition to provide for movement of the vehicle in reverse.

Let it be assumed that it is now desired to start and operate the vehicle in reverse. The operator first moves handle 150 of the controller 47 from neutral position to the low gear drive position, indicated in Fig. 8. During this movement the button 204 on the lower side of the handle moves over the raised part 205 on the bail 201 and thereby actuates the bail to unseat the valve 195. This may be of no consequence at this time since handle 166 of the throttle control valve device 165 should be in the idling position in which chamber 168 in the interlock valve device 169 is vented so that opening communication between the chamber at the opposite side of diaphragm 180 past the valve 195 in the control device will not cause any change in position of the parts of the interlock device 169.

In the low gear drive position of handle 150 the controller 47 operates to increase the pressure in the control pipe 46 and thereby in piston chambers 130, 81 and 70 in the selector valve device 50 from the fifteen pounds provided in neutral position of said handle to the desired higher degree such as thirty five pounds above mentioned.

This higher degree of pressure obtained in chamber 130 of the selector valve device merely maintains piston 120 in the lower position shown so that the plug valve 105 also remains in the selected position shown and above mentioned. The increased pressure in chamber 81 on piston 80 also has no effect since spring 96 is of such force as to maintain said piston in its normal position shown against such pressure. The thirty five pounds pressure obtained in chamber 70 and acting on the piston 69 however is adapted to move said piston downwardly against the opposing pressure of the control spring 73 to thereby seat the valve 66 and unseat the valve 57.

With valve 57 unseated liquid under pressure from the hydraulic supply reservoir 52 is adapted to flow past said valve to passage 56 and from thence in one direction to pipe 20 leading to the low speed clutch control cylinder 17 and in another direction to the double check valve chamber 97. The left-hand face of the double check valve 98 is thereby subjected to hydraulic pressure while the opposite face is open past the valve 90 to the sump passage 61 and as a result the double check valve will be moved to the position shown, unless it is already in that position, for disconnecting passage 92 from chamber 97 and for opening communication between the passages 56 and 99.

Hydraulic pressure will therefore be transmitted from passage 56 through the passage 99 to the plug valve 105 and thence through annular groove 106 and ports 107 and 108 to the radial ports 109, and thence through the one port 109 which is in registry with passage 110 to pipe 41 which leads to the reverse clutch cylinder 40. The reverse clutch cylinder is thereby operated to engage the reverse clutch 33 for securing the reverse gear 30 in the directional control device 27 to rotate with the axle 2 for moving the vehicle in reverse when power is applied to the driving gear 28.

The hydraulic pressure applied to the low gear clutch cylinder 17 by way of pipe 20 actuates the low gear clutch 11 to secure the low speed gear 8 to rotate with the secondary drive shaft 5, so that rotation of the primary shaft 3 by the engine 1 will be transmitted to the secondary drive shaft 5 for turning the gear 28 and thereby the axle 2 through gear 30.

After the engine 2 is thus connected to the drive axle 2 of the vehicle, handle 166 of the throttle control valve device 165 may be operated to increase the pressure of fluid in the throttle control pipe 167 and thereby in the connected pipe 172 to cause operation of the relay valve device 175 to provide a corresponding pressure in the throttle cylinder 160 for effecting movement of the throttle control piston 163 away from idling position to provide a desired degree of acceleration of engine 1 for getting the vehicle under motion. After the vehicle is started, the operator may continue the movement of handle 166 of the throttle control valve device 165 in a direction for increasing the pressure in the throttle control cylinder 160 to increase the speed or power of engine 1 for in turn accelerating the vehicle.

After the vehicle speed is increased through the low gear drive of the transmission 4 to a chosen degree at which it is desired to cut in the high speed gears 7 and 9 of the transmission, the operator merely moves the handle 150 of the controller 47 from the low gear drive position to the high gear drive position indicated in Fig. 8. As the handle 150 is thus operated, the button 204 projecting from the lower face thereof engages the raised part 206 of bail 201 and thereby rocks said bail in a downwardly direction to unseat a poppet valve 195.

When handle 166 of the throttle control device was operated for increasing the pressure in chamber 168 of the interlock valve device 169 and thereby on the relay valve device 175 to accelerate the engine 1 with the low speed gears 6 and 8 in the transmission device 4 effective as just described, this pressure equalized through the port 187 into chambers 189 and 191 at the opposite side of the diaphragm 180 and the spring 185 was permitted to maintain said diaphragm and thereby the slide valve 170 in their normal positions shown since the poppet valve 195 was seated at this time.

The unseating of valve 195 by handle 150 as it is moved to high gear drive position as just mentioned, however, opens communication between the chambers 191 and 189 and the atmosphere for venting fluid under pressure from said chambers at a rate exceeding the rate of supply through port 187 so as to thereby establish a sufficient differential in pressures on the opposite sides of the diaphragm 180 to deflect same against spring 185. This deflection of diaphragm 180 moves the slide valve 170 from the position shown to the position in which the throttle control pipe 171 to open to the atmospheric vent port 194. Fluid under pressure is thereby vented from the relay control pipe 172 whereupon the relay valve device 175 operates to vent the fluid under pressure from the throttle control piston chamber 163. The spring 164 in the throttle control cylinder then promptly moves the piston 161 to the idling position shown for thereby reducing the speed of the engine 1 to idling while changing gears. It will thus be apparent that when the handle 150 is moved from the low gear drive to the high gear drive position, the speed of engine 1 is automatically reduced to idling without any operation of handle 166 of the throttle control device 165.

When the handle 150 obtains high gear drive position, however, the button 204 is moved past the raised part 206 of bail 201 so that the pressure of spring 199 on the poppet valve 195 is permitted to seat said valve. Following this the fluid under pressure supplied to the valve chamber 168 in the interlock valve device 169 from the throttle control valve device 165 gradually equalizes through port 187 into chambers 189 and 191, and when sufficiently increased spring 185 is adapted to return the diaphragm 180 and slide valve 170 to their normal positions shown. With the slide valve 170 thus returned to its normal position fluid at the pressure supplied to valve chamber 168 by the throttle control device 165 again becomes effective through pipes 171, 172 and 174 on the relay valve device 175 to actuate same to supply fluid at a corresponding pressure to piston chamber 163 in the throttle control cylinder 160 for thereby returning the throttle of engine 1 to the same position it occupied at the time of movement of handle 150 out of the low gear drive position.

When the handle 150 is moved to the high gear drive position, the pressure in the control pipe 46 and thereby in chamber 130 and passage 72 in the selector valve device 45 is also increased to the desired high degree, such as sixty-five pounds. This higher pressure in the selector valve device maintains the piston 120 in its lower position and also tends to maintain the piston 69 in its lower position. Further, this increased pressure acts through the choke 82 to provide a gradual increase in pressure in chamber 81 above the piston 80. When the pressure in chamber 81 is thus increased to some chosen degree, such as forty-five pounds, the piston 80 starts to move downwardly against the pressure of spring 96. After a slight downward movement of piston 80, the piston laps the lower end of a groove 211 to disconnect same from chamber 83 and at substantially the same time opens a passage 210 to chamber 81, the passage 210 leading to chamber 62 below the piston 69.

The piston 69 at this instant is in its lower low gear drive position lapping passage 75. Through passage 210 fluid under pressure is therefore adapted to flow from piston chamber 81 to chamber 62 and the pressure of fluid in these chambers will then increase in unison through the choke 82. When the pressure is thus increased in chamber 62 below the piston 69 to a degree such as thirty pounds, such pressure acting in conjunction with spring 73 on the lower face of piston 69 is adapted to overcome the higher pressure, such as sixty-five pounds, in chamber 70 acting on the opposite face of the piston and return said piston to its upper position shown to permit seating of valve 57 and unseating of valve 66. With valve 66 unseated, the hydraulic pressure in the low gear clutch cylinder 17 is relieved and the low gear clutch 11 disengaged, as a consequence.

In the upper position of piston 69 the port 75 is uncovered to connect the timing reservoir 76 to chamber 62 so that fluid supplied through choke 82 must then increase the pressure in said reservoir along with that in chambers 62 and 81. The flow capacity of port 75 is so related to that of choke 82 that a sufficient pressure will be maintained in chamber 62 below the piston 69 to hold same in its upper position. The purpose of connecting reservoir 76 to chambers 72 and 81 at this time is to delay obtaining a sufficient pressure in chamber 81 to move piston 80 to its lower position against spring 96 until after disengagement of the low gear clutch 11, resulting from return of piston 69 to its upper position, is ensured.

When the valve 66 is unseated upon movement of piston 69 to its upper position, it will be noted that both the low speed clutch cylinder 17 and the reverse clutch cylinder 40 will be placed in communication with the sump passage 61 and thereby relieved of hydraulic pressure. The reverse clutch 33 will be thus disengaged along with the low speed clutch 11, but this is of no importance. When the pressure in piston chamber 81 as well as in chamber 62 and reservoir 76 has been increased by flow through port choke 82 to substantially the sixty-five pounds provided in the control pipe 46 and in passage 72 by the controller 37 in the high gear position, such pressure is adapted to move the piston 82 to its lower position against spring 96 for seating the valve 90 and unseating the valve 94. With the valve 94 unseated hydraulic pressure from the supply reservoir 52 is adapted to be transmitted to passage 92 and thence in one direction through pipe 25 to the high speed clutch cylinder 24 and in another direction to the right-hand face of the double check valve 98.

The hydraulic pressure thus obtained in the high speed clutch cylinder 24 is adapted to engage the high speed clutch 23 and connect the engine through the high speed gears 7 and 9 to the secondary drive shaft 5. The hydraulic pressure obtained on the right-hand side of the double check valve 98 is adapted to effect movement thereof to its left-hand seated position to open communication between passages 92 and 99 so that hydraulic pressure will again be applied through the plug valve 105 to the reverse clutch operating cylinder 40 for actuating the reverse clutch 33 to again connect the reverse gear 30 to the drive axle 2 of the vehicle. The engine 1 is thereby connected to the drive axle through the high speed gears for causing further acceleration of the vehicle and operation thereof at a desired high speed determined by the position of handle 166 of the throttle control device 165.

It is desired to point out that the change in transmission from low speed to high speed and the reengagement of the reverse clutch 33 is adapted to occur before the interlock valve device 169 returns from its left-hand or engine idling position to its normal position shown, so that the change in drive between the engine 1 and axle 2 occur only while the engine 1 is idling. The control by choke 187 of the recharging of chambers 189 and 191 insures this result. It will also be noted that since movement of piston 80 to its lower or high gear drive position can not occur until the lapse of a certain period of time after the low speed piston 69 is returned to its upper position, the disengagement of the low gear clutch 11 is assured before engagement of the high speed clutch 23.

Now let it be assumed that a condition arises where the operator desires to change the transmission from high gear back to low gear. To accomplish this he merely moves the handle 150 of the controller 47 back to the low gear drive position and during such movement effects operation of the interlock valve device 169 to automatically effect a reduction in the speed of engine 1 to idling. In the low gear drive position the controller 47 acts to reduce the pressure in the control pipe 46 and thereby in chambers 130 and 70 in the selector valve device 45 to the thirty-five pounds called for in said position.

As the pressure in the control pipe 46 is thus reduced the pressure in the timing reservoir 76 is correspondingly reduced by flow past the check valve 77 and at the same time the pressure of fluid in chamber 81 above the high speed piston 80 and in chamber 62 below the low speed piston 69 reduces by flow through the choke 82 to passage 72 and through port 75 to the timing reservoir 76.

Upon a slight reduction in pressure in chamber 81 above piston 80 the spring 96 becomes effective to return said piston to its upper position for thereby unseating the valve 90 and seating the valve 94. The hydraulic pressure in the high speed clutch cylinder 24 is thereby relieved to effect disengagement of the high speed clutch 23. At the same time, the hydraulic pressure in the reverse clutch control cylinder 40 is also relieved so that the reverse clutch 33 is disengaged.

It will be noted that the pressure of fluid in chamber 62 below the low speed piston 69 and in the timing reservoir 76 can reduce by flow past the check valve 77 only to that provided in the control pipe 46 with the controller handle 50 in the low gear drive position. This reduction will therefore not provide a differential of pressures on the piston 69 to cause movement thereof to its lower position. However, when the piston 80 obtains its upper position the groove 211 is opened to chamber 83 and thence to atmosphere through the vent port 84 so as to provide for further and complete venting of fluid under pressure from chamber 62 below the low speed piston 69 and from the timing reservoir 76.

As before mentioned a differential of pressures on the low speed piston 69 of substantially thirty-five pounds is required to effect movement thereof to its lower position against the spring 73, and this differential will be obtained when the pressure of fluid in chamber 62 becomes substantially equal to that of the atmosphere by venting through the groove 211, and when this condition is obtained the control pipe pressure in chamber 70 will move the piston 69 to its lower position for seating the valve 66 and unseating the valve 57.

With the valve 57 thus unseated, liquid under pressure will again be supplied to the low gear cylinder 17 to operate the low gear clutch 11 for thereby rendering the low speed gears 6 and 8 in the transmission device 4 effective to transmit power from the primary drive shaft 3 to the secondary shaft 5. At the same time the reverse cylinder 40 will be also operated again to connect the reverse drive gear 30 to the axle 2 so that the engine 1 may apply power to the axle through the low gear drive.

At substantially the time the engine 1 is again connected to the axle 2 through the low gear clutch 11 the interlock valve device will be returned to its normal position for returning the throttle control piston 163 to the position occupied prior to initiating the shifting operation.

It is of course understood that after any shifting operation has occurred, the throttle control valve handle 166 may be readjusted to suit operating conditions or the desire of the operator. However, the interlock valve device 169 precludes any need for the operator to turn the throttle control valve handle 166 back to idling position each time he changes the drive in the transmission, as will be apparent.

Whenever the operator desires to disconnect the engine 1 from the axle 2 in order for instance to stop the vehicle, he moves the handle 150 of the controller back to the neutral position for thereby reducing the pressure in the control pipe 46 and thus in piston chambers 130, 81 and 70 in the selector valve device 45 to the relatively low value of fifteen pounds hereinbefore mentioned.

This reduced pressure acting on piston 120 in the selector valve will however maintain it in its lower position shown, but regardless of previous positions of the high and low speed selector pistons 80 and 69 the springs 96 and 73 will return same to their upper positions against said pressure acting in the chambers 81 and 70. With these pistons in their upper positions both valves 90 and 66 are unseated so that both the high and low gear clutch cylinders 24 and 17, respectively, as well as the reverse cylinder 40 are open to the sump passage 61. Thus both clutches 11 and 23 in the transmission device 4 will be disengaged to disconnect the engine drive shaft 3 from the secondary drive shaft 5, and both clutches 32 and 33 in the directional control device 27 will also be disengaged, so that the engine 1 will be disconnected from the axle 2 to permit stopping of the vehicle.

Whenever it is again desired to operate the vehicle the handle 150 of the controller may again be turned from the neutral position to the low gear or high gear positions as desired and selector device 45 will again operate automatically as hereinbefore described.

It will be noted that the piston 120 which controls the plug valve 105 is held in its lower position and that the position of the plug valve itself is not changed during the operation above described. In other words as long as the control pipe 46 is maintained charged with fifteen pounds pressure the directional control piston 120 and plug valve 105 will remain in a position providing for a selected direction of vehicle movement.

In case it is desired to operate the vehicle in the opposite or forward direction it is necessary for the operator to move the handle 150 from the neutral position to the reverse position defined by contact with shoulder 152 for effecting substantially complete venting of fluid under pressure from the control pipe 46 and piston chamber 130 in the selector valve device 45. When the pressure in chamber 130 is thus reduced to below a certain degree such as ten pounds the spring 132 becomes the predominate force on piston 120 and effects movement thereof in an upwardly direction into engagement with the cover 134. As the piston is thus moved, the pawl 124 acting on a ratchet tooth 118 turns the plug valve 105 through an arc of forty five degrees and this rotation reverses the fluid connections with the directional control clutch cylinder pipes 38 and 41, that is, the reverse pipe 41 is disconnected from the hydraulic supply port 109 in the plug valve 105 and connected to a vent port 112 while the forward clutch cylinder pipe 38 is disconnected from a vent port 112 and placed in communication with a hydraulic supply port 109 so as thereby render the reverse clutch 33 non-operating and the forward clutch 32 operating.

In order to now operate the vehicle in the forward direction the controller handle 150 is again moved to the neutral position for recharging the control pipe 46 to the fifteen pounds above mentioned. This effects movement of the piston 120 and ratchet pawl 124 to the positions shown in the drawing, this movement being relative to the plug valve 105. Upon subsequent movement of the handle 150 to either the low or high gear drive positions the hydraulic fluid supplied past the double check valve 98 to passage 99 will be applied through pipe 38 to the forward clutch cylinder 37 to effect operation of clutch 32 to connect the forward gear 29 with the axle 2 whereby upon operation of the transmission device 4 to connect the engine 1 with said gear the vehicle will be moved in a forwardly direction. Except for this one difference the entire mechanism will operate in response to operation of the control handle 150 in the same manner as when the cock 105 was positioned to provide reverse movement of the vehicle.

When it is again desired to operate the vehicle in the reverse direction, it is only necessary to move the controller handle 150 to the reverse position for thereby reducing the pressure in the control pipe 46 to substantially that of the atmosphere in order to permit the piston 120 to again be moved to its upper position by spring 132 for turning the plug valve 105 another forty-five degrees to reverse the fluid connections between the pipes 38 and 41 leading to the directional control clutch cylinders 37 and 40. When the control pipe pressure is again increased upon movement of the handle 150 to neutral position the piston 120 will again return to the lower position shown. Each forty-five degrees rotation of the plug valve 145 will reverse the fluid connections between the pipes 38 and 41, and hence the four cross ports 109 and four intermediate vent ports 112 located forty-five degrees apart.

The depth of the right-hand side wall of notch 154 in the quadrant 151, as viewed in Fig. 8, as well as the depth of notches 155 and 156 is such that the handle 150 may be readily moved between the neutral and low gear and high gear positions, the several notches merely acting to indicate to the operator when the desired position of the handle is obtained. The portion of the quadrant between the left-hand wall of notch 154 and shoulder 152 is however formed at a greater radius than the portion at the opposite side of notch 154 thereby providing a deeper shoulder at the left-hand side of notch 154, as viewed in Fig. 8, for engagement by the handle detent 157. By this structure a greater degree of manual force is required on the handle 150 to move same from the neutral position to the reverse position, the purpose being to prevent the operator from unintentionally effecting such movement.

It is understood that while a vehicle is operating there may be an unintentional loss of pressure in control pipe 46 due possibly to rupture thereof or to failure of a connector 44 at an end of the pipe. Such loss of pressure will result in the piston 120 moving to its upper position and thereby operating the cock 105 to reverse the connections between the directional control cylinders 37 and 40. It would of course be undesirable to throw the locomotive or vehicle in reverse gear while the high or low gear clutch in the transmission 4 is in engagement. Such undesired operation is however prevented since the relatively great force of springs 73 and 96 acting on the low and high speed pistons 69 and 80 will move same to their upper positions for disconnecting the engine from the secondary drive shaft 5 before the relatively low force of spring 132 acting on the piston 120 can effect operation thereof and thereby of the cock 105 to reverse the connections to the forward and reverse control cylinders 37 and 40.

A handle guard 213 is secured to the quadrant 151 and has a slot 214 extending parallel to the plane of the quadrant through which the handle 150 is adapted to be moved to its different controlling positions, as shown in Figs. 1 and 7. The guard 213 also has an opening 215 connecting the slot 214 to the top of the guard, this opening being of sufficient width and so located that in neutral and handle-off position of handle 150, the handle may be lifted vertically, as viewed in Fig. 7, and removed from the controller.

The throttle control device 165 also has a handle guard 216 which provides for removal of handle 166 only in engine idling position.

By providing the guards 213 and 216, the operator may remove the handles 150 and 166 and take them with him in case he has to leave the vehicle for any reason, so as to thereby prevent malicious or unwarranted operation of the power and drive systems of the vehicle while he is absent.

Operation—two coupled vehicles

As before mentioned, both of the control pipes 172 and 46 extend to both ends of the vehicle or locomotive for connection with corresponding pipes on a second locomotive in case it is desired to operate two together.

Under such a condition the cock 49 in branch pipe 48 on the second or non-controlling locomotive will be closed to disconnect the control pipe 46 from the controller 47 so as to thereby ensure that the pressure in control pipe will be varied only in response to operation of handle 150 on the controller 47 of the leading locomotive. For a like reason a cock 212 is provided in pipe 167 leading to the throttle control valve device 165 and this cock is also closed on the non-control locomotive.

With the equipment on the two locomotives thus connected together and the cocks 49 and 212 on the non-control locomotive both closed, the selector valve devices 45 on the two locomotives will operate in unison in response to variations in the pressure in the control pipe 46 effected by operation of the controller 47 on the control locomotive to provide on both locomotives the same cntrol between the engine 1 and axle 2 as hereinbefore described for the single vehicle. Likewise the relay valve devices 175 and throttle cylinders 160 as well as the interlock valve devices 169 on the two locomotives will operate in unison in response to variations in pressure in the pipe 172 as controlled by the throttle control valve device 165 on the control vehicle, as will be apparent.

At the time of coupling two vehicles together for double heading and operating in unison under the control of the controllers 47 and 165 on one locomotive, it will be noted that the directional control cock 105 on one locomotive may be adjusted to provide for movement of that locomotive in one direction, while the said cock on the other locomotive may be adjusted to provide for movement in the opposite direction. This of course would be undesirable but is adapted to be corrected by the operator inserting key 148 in the bore 147 at the right hand side of opening 144, as viewed in Fig. 5, in one of the selector valve devices 45 and then turning said key and thereby the cock to a position in which the key engages the shoulder 145 at the opposite end of the opening 144. The key 148 is then removed and the locomotives, while remaining coupled, will then operate in unison.

In case the front end of one locomotive is coupled to the rear end of the other locomotive the same legends F or R will appear in the windows 146 of the two selector valve devices 45, when conditioned to provide synchronous operation but it should be noted that in case the front ends or rear ends of both locomotives are coupled together, the legend F will be visible on one locomotive and the legend R on the other locomotive when the two selector valve devices 45 are adjusted to provide synchronous operation.

Summary

It will now be apparent that there has been provided an improved control system for a selective speed gear transmission and a forward and reverse directional control mechanism of a vehicle which is relatively simple in construction, yet positive in operation. Each change in the vehicle drive is dependent upon the establishment of a distinctly different degree of fluid pressure and each different degree of pressure is positively obtained merely by moving the handle of a manual control device to a selected position. In each position of the manually control device it will be apparent that only the desired operation will occur since all other operations are dependent upon the establishment of different degrees of control pressure which are obtainable only in distinctly different positions of the manual control device.

The system is particularly adapted for remote control of devices such as a selective gear transmission and a forward and reverse directional control mechanism and for the unified operation of a plurality of such devices connected to a common control pipe.

The interlock provided between the engine throttle control and the transmission control provides for automatically reducing the speed of the engine to idling while effecting a change in gear and then bringing the speed of the engine back to that existing before such change, to thereby insure the proper operation of the throttle at the time of effecting a gear change without attention on the part of the operator. In addition, this automatic throttle control relieves the operator to a certain degree of tiring manual effort in cotnrolling the vehicle.

Having now described my invention, what I claim as new and desire to secure by Letters Patent, is:

1. A fluid pressure control mechanism for selectively controlling the operation of a plurality of different devices comprising a control pipe, three movable abutments subject on one face to the pressure of fluid in said control pipe, a spring acting on each of said abutments in opposition to the pressure of fluid thereon, each of said abutments having a normal position and being so designed with respect to the spring acting thereon as to require the establishment of a pressure in said pipe to effect movement thereof from said normal position which is of a different degree than required to effect movement of each of the other of said abutments from normal position, valve means controlled by movement of each of said abutments for controlling one of said devices, and a manually operative device for selectively establishing in different positions the different degrees of fluid pressure in said pipe required for effecting movement of each of said abutments from normal position.

2. A fluid pressure control mechanism for selectively controlling the operation of a plurality of different devices comprising a control pipe, a manually operative device for selectively establishing in said pipe one or another of a plurality of different degrees of fluid pressure, and a selector valve device operative in accordance with said different degrees of fluid pressure for selectively controlling said devices, said selector valve device comprising a spring, a movable abutment subject to the opposing pressures of said spring and the fluid in said pipe and movable from a normal position on the establishment of a certain degree of fluid pressure in said pipe, another spring, another movable abutment subject to the opposing pressures of the last named spring and the pressure of fluid in said pipe and movable from a normal position upon establishment of a higher degree of fluid pressure in said pipe, a third spring, a third movable abutment subject to the opposing pressures of said third spring and the pressure of fluid in said pipe and movable to one position upon the establishment of a pressure in said pipe which is lower than required for moving the first named abutment from its normal position and being movable to another position upon a reduction in such lower pressure, valve means operative by movement of each of the first two named abutments from their normal positions for effecting operation of one of said devices, and valve means for controlling another of said devices operative by the third named abutment upon said reduction in said lower fluid pressure thereon.

3. A fluid pressure control mechanism for selectively controlling the operation of a plurality of devices comprising a control pipe, manually operative means having one position for establishing a certain degree of fluid pressure in said pipe, another position for establishing a different degree of fluid pressure in said pipe, and a third position for establishing a still different degree of fluid pressure in said pipe, a spring, a movable abutment subject to the opposing pressure of said spring and of the fluid in said control pipe and adapted to be maintained in said normal position by said spring when said manually control device is in said first named position and adapted to be moved out of said normal position by the pressure of fluid established in said pipe upon movement of said manually operative device to its second named position, a second spring, another movable abutment subject to the opposing pressures of said second spring and fluid in said control pipe and adapted to be maintained in a normal position by the pressure of said second spring against the pressure of fluid established in said pipe in the two first named positions of said manually operative device and being movable out of said normal position by the pressure of fluid established in said pipe in the third named position of said manually operative device, the last named abutment being operative upon initial movement from its normal position to reduce the pressure differential on the first named movable abutment for rendering the spring acting thereon operative to return same to said normal position, valve means operative by the first named abutment upon movement from its normal position for controlling one of said devices, and valve means operative by movement of the second named abutment after said initial movement thereof for effecting operation of another of said devices.

4. A fluid pressure control mechanism for selectively controlling the operation of a plurality of different devices comprising a control pipe, manually operative means having one position for providing a certain degree of pressure in said pipe, another position for establishing a different degree of fluid pressure in said pipe, and a third position for establishing a higher degree of fluid pressure in said pipe, a spring, a piston subject on one face to pressure of fluid in said pipe and on its opposite face to the pressure of said spring and being movable from a normal position by the pressure of fluid established in said pipe in the second named position of said manually operative means, another spring, another piston subject in a chamber at one face to the pressure of fluid in said pipe and on the opposite face to the pressure of the second named spring and being movable from a normal position only upon establishing said higher fluid pressure in said pipe, a choke in the communication between said chamber and pipe for retarding the increase in pressure on said last named piston upon movement of said manually operative means to its last named position, the last named piston being operative upon a certain initial movement from its normal position to connect said chamber to the spring side of the first named piston for supplying fluid under pressure thereto to reduce the pressure differential on the first named piston for thereby rendering the first named spring operative to return the first named piston to its normal position, a timing volume, the first named piston being operative upon return to its normal position to connect said volume to said chamber to delay obtaining on the second named abutment the pressure of fluid provided in said pipe in the third named position of said manually operative means, valve means for controlling one of said devices operative upon movement of the first named piston from its normal position, and other valve means for controlling another of said devices operable upon movement of said second named piston after the said certain initial movement thereof.

5. A fluid pressure control mechanism for selectively rendering either a high or a low gear drive connection effective between an engine and a drive axle of a vehicle comprising a control pipe, a manually operative device having a normal position and being movable therefrom to one operating position for establishing a certain degree of fluid pressure in said pipe and to another operating position for establishing a different degree of fluid pressure in said pipe, a spring, a movable abutment subject to the opposing pressures of said spring and of fluid in said control pipe and having a normal position for rendering said low gear drive connection ineffective and being movable from said normal position to render said low drive connection effective upon establishment of the fluid pressure in said pipe provided in the second named position of said manuarl control device, a second spring, a second movable abutment for controlling said high gear drive connection and having a normal position for rendering same ineffective and being movable from the normal position to render the high gear drive connection effective, said second abutment being subject to the opposing pressures of said second spring and the pressure of fluid in a chamber connected to said pipe through a choke and being movable from said normal position upon establishment in said chamber of the fluid pressure provided in said pipe in the third named position of said manually operative device, and means controlled by the second named piston and operative upon initial movement thereof from its normal position and prior to rendering said high gear drive connection effective to effect movement of the first named abutment to its normal position.

6. A fluid pressure control mechanism for selectively controlling a high and low gear drive connection between an engine and a drive axle of a vehicle comprising a low gear control element operative when subject to hydraulic pressure to render said low gear drive connection effective, a high gear control element operative when subject to hydraulic pressure to render said high gear drive connection effective, a control pipe, means operative upon establishment of a certain degree of fluid pressure in said control pipe to subject said low gear element to hydraulic pressure, means operative upon establishment of a higher degree of fluid pressure in said control pipe to effect operation of the first named means to relieve the hydraulic pressure on said low gear element and to subject said high gear element to hydraulic pressure, and a manually operative device having two different positions for selectively establishing said different degrees of fluid pressure in said control pipe and a third position for establishing a still different degree of pressure in said control pipe to render both of said means operative to relieve the hydraulic pressure on said low and high gear elements.

7. A fluid pressure control mechanism for selectively controlling a high and a low gear drive connection between an engine and a drive axle of a vehicle comprising a control pipe, a manually operative device having a normal position to provide a certain pressure in said pipe, and being movable therefrom to another position for providing a certain intermediate pressure in said pipe and being movable to a third position for providing a still higher pressure in said pipe, a piston for controlling said low gear drive connection subject on one face to the fluid in said pipe, a spring in a chamber at the opposite side of said piston and acting thereon in opposition to the pressure of fluid in said pipe and providing for movement of said piston from said normal position by said intermediate pressure to render said low gear drive connection effective, another piston subject to the pressure of fluid in a second chamber connected to said pipe through a choke, a spring acting on the last named piston in opposition to the pressure of fluid thereon and providing for movement thereof from a normal position upon an increase in pressure in said second chamber through said choke to said higher degree to render said high gear drive connection effective, means controlled by the second named piston and operative upon preliminary movement thereof from normal position to connect said second chamber to the first named chamber to provide for flow of fluid under pressure to the first named chamber to reduce the differential of fluid pressures on the first named piston for rendering the spring acting thereon effective to return same to its normal position, a timing reservoir connected to said chambers by said first named piston in its normal position for delaying the increase in pressure on the second named piston through said choke, the second named piston in its normal position opening communication between the chamber at the spring side of the first named piston and the atmosphere and being operative to close said communication upon initial movement from its normal position.

8. A fluid pressure control mechanism for selectively controlling a high and a low gear drive connection between an engine and a drive axle of a vehicle comprising a control pipe, a manually operative device having a normal position to provide a certain pressure in said pipe, and being movable therefrom to another position for providing a certain intermediate pressure in said pipe and being movable to a third position for providing a still higher pressure in said pipe, a piston for controlling said low gear drive connection subject on one face to the fluid in said pipe, a spring in a chamber at the opposite side of said piston and acting thereon in opposition to the pressure of fluid in said pipe and providing for movement of said piston from said normal position by said intermediate pressure to render said low gear drive connection effective, another piston subject to the pressure of fluid in a second chamber connected to said pipe through a choke, a spring acting on the last named piston in opposition to the pressure of fluid thereon and providing for movement thereof from a normal position upon an increase in pressure in said second chamber through said choke to said higher degree to render said high gear drive connection effective, means controlled by the second named piston and operative upon preliminary movement thereof from normal position to connect said second chamber to the first named chamber to provide for flow of fluid under pressure to the first named chamber to reduce the differential of fluid pressures on the first named piston for rendering the spring acting thereon effective to return same to its normal position, a timing reservoir connected to said chambers by said first named piston in its normal position for delaying the increase in pressure on the second named piston through said choke, the second named piston in its normal position opening communication between the chamber at the spring side of the first named piston and the atmosphere and being operative to close said communication upon initial movement from its normal position, said timing reservoir having a connection with said pipe, and a check valve in said connection providing for flow of fluid under pressure only in the direction of said reservoir to said pipe.

9. A fluid pressure control mechanism for selectively controlling the operation of two hydraulically operated devices comprising in combination with a source of hydraulic pressure, a control pipe, a manually operative device for selectively effecting the establishment of either of two different control pressures in said pipe and a third and lower pressure in said pipe, valve means movable from a normal position for rendering one of said hydraulic devices operative, a spring, a movable abutment subject to the opposing pressures of said spring and of fluid in said pipe and responsive to the lower of said two control pressures for effecting movement of said valve means from normal position, other valve means movable from a normal position for rendering the other of said hydraulic devices operative, a second spring, another movable abutment subject to the opposing pressures of said second spring and of fluid pressure in said pipe and operative upon establishment of the higher of said two pressures therein to effect movement of last named valve means from normal position, and means controlled by the last named abutment and operative thereby prior to effecting movement of the last named valve means from normal position to effect operation of the first named abutment to return the first named valve means to normal position.

10. A fluid pressure control mechanism for selectively controlling the operation of a plurality of pressure responsive devices comprising a casing having a passage through which fluid under pressure is adapted to be supplied for operating said devices, each of said devices having an actuating pipe connected to said casing, and a rotatable valve in said casing arranged to control communication between said pasasge and the actuating pipes and operative upon rotation to alternately connect first one of said actuating pipes to said passage and then the other of said actuating pipes to said passage, a control pipe in which the pressure of fluid is adapted to be varied, manually operable means for varying the pressure in said control pipe, and means responsive to a variation in pressure in said control pipe to turn said valve through an arc adapted to reverse the connections between said actuating pipes and passage.

11. A fluid pressure control mechanism for selectively controlling the operation of a plurality of pressure responsive devices comprising a casing having a passage through which fluid under pressure is adapted to be supplied for operating said devices, each of said devices having an actuating pipe connected to said casing, a rotatable valve in said casing arranged to control communication between said passage and the actuating pipes and operative upon rotation to alternately connect first one of said actuating pipes to said passage and then the other of said actuating pipes to said passage, a control pipe, means conditionable upon an increase in pressure in said control pipe for turning said valve upon a reduction in pressure in said pipe through an arc for reversing the connections between said actuating pipes and said passage, and manually operable means for effecting variations in pressure in said control pipe.

12. A fluid pressure control arrangement for selectively controlling the operation of two pressure operated devices comprising a control pipe and a valve device having a casing through which fluid under pressure is adapted to be supplied for actuating said devices, an actuating pipe connecting each of said devices to said casing, and a rotatable valve in said casing operative upon rotation through a plurality of different positions to alternately open first one of said actuating pipes to said passage and then the other actuating pipe to said passage, a pawl and ratchet for turning said valve, and means operative upon an increase in pressure in said control pipe to condition said pawl and ratchet to turn said valve on a reduction in pressure in said control pipe through an arc sufficient to effect reversal of the connections of said actuating pipes with said passage, and a manually operable device having positions for increasing and decreasing the pressure of fluid in said control pipe.

13. A fluid pressure control arrangement for two pressure controlled devices comprising a pressure control pipe, a valve device having a fluid supply passage through which fluid under pressure is adapted to be supplied for operating said devices and having other passages connected to each of said devices, a rotatable valve arranged to control communication between said passages and rotatable to a plurality of positions equally spaced around a circle for establishing in each alternate position communication between said supply passage and one of said devices and in the other positions communication between said supply passage and the other of said devices, pawl and ratchet means associated with said valve and operative upon a variation in pressure in said control pipe to turn said valve from one of its positions to another, manually operable means for effecting variations in pressure in said control pipe, and an indicating device conditionable upon positioning of said valve for indicating which of said devices is connected to said supply passage.

14. A fluid pressure control arrangement for two pressure controlled devices comprising a pressure control pipe, a valve device having a fluid supply passage through which fluid under pressure is adapted to be supplied for operating said devices and having other passages connected to each of said devices, a rotatable valve arranged to control communication between said passages and rotatable to a plurality of positions equally spaced around a circle for establishing in each alternate position communication between said supply passage and one of said devices and in the other positions communication between said supply passage and the other of said devices, pawl and ratchet means associated with said valve and operative upon a variation in pressure in said control pipe to turn said valve from one of its positions to another, manually operable means for effecting variations in pressure in said control pipe, and means operative manually to also turn said valve from one position to another.

15. A fluid pressure control arrangement for two pressure controlled devices comprising a pressure control pipe, a valve device having a fluid supply passage through which fluid under pressure is adapted to be supplied for operating said devices and having other passages connected to each of said devices, a rotatable valve arranged to control communication between said passages and rotatable to a plurality of positions equally spaced around a circle for establishing in each alternate position communication between said supply passage and one of said devices and in the other position communication between said supply passage and the other of said devices, pawl and ratchet means associated with said valve and operative upon a variation in pressure in said control pipe to turn said valve from one of its positions to another, manually operable means for effecting variations in pressure in said control pipe, and an indicating device secured to rotate with said plug valve and having alternated spaced legends thereon indicating the two said devices, and means arranged to mask all of said legends except one indicating the device connected to said supply passage in each position of said valve.

16. A system for controlling the power transmission between a drive engine and an axle of a vehicle comprising forward directional control means operative to provide a drive connection between the engine and axle to propel the vehicle in a forward direction, reverse directional control means operative to provide a drive connection between said engine and axle to propel said vehicle in a reverse direction, transmission control means for connecting and disconnecting said engine from said forward control means and said reverse control means, a fluid pressure control pipe, means operative upon an increase in pressure in said pipe to a certain degree and upon a subsequent reduction in pressure in said pipe to render said forward directional control means effective and upon another increase in pressure in said pipe to said certain degree and a subsequent reduction in such pressure to render said reverse control means effective, another means controlled by the pressure of fluid in said pipe for controlling said transmission means and operative when the pressure in said pipe is increased to a degree exceeding said certain degree to render said transmission means effective and when less than the last named degree ineffective.

17. A system for controlling power transmission between a drive engine and axle of a vehicle comprising forward directional control means operative to provide a drive connection between said engine and axle to propel the vehicle in a forward direction, reverse directional control means operative to provide a drive connection between said engine and axle to propel the vehicle in a reverse direction, transmission means for connecting and disconnecting said engine from said forward and reverse directional control means, a control pipe, means operative upon an increase in pressure in said control pipe to a certain degree and upon a subsequent reduction in such pressure to select said forward directional control means for operation and upon another increase in pressure in said pipe to said certain degree and a subsequent reduction therein to select said reverse directional control means for operation, and means upon an increase in said pressure in said pipe to a degree higher than said certain degree to effect operation of both said transmission means and the selected directional control means for connecting said engine with said axle, the last named means being operative when the pressure in said pipe is less than said higher pressure to effect operation of both said transmission means and the selected directional control means to break the drive connection between said engine and axle.

18. A system for selectively controlling a high gear drive means, a low gear drive means, a forward directional control means, and a reverse directional control means in a power transmitting connection between an engine and drive axle of a vehicle, said system comprising a control pipe, selector means operative upon an increase in pressure in said pipe to a certain degree and a subsequent reduction in pressure in said pipe below said certain degree to select said forward directional control means for determining the direction of vehicle movement, means operative upon an increase in pressure in said control pipe to a greater degree than said certain degree to render said low gear drive means effective, other means operative upon a further increase in pressure in said control pipe to a still higher chosen degree to first render said low gear drive means ineffective and then said high gear drive means effective, the two last named being rendered ineffective upon a reduction in pressure in said pipe to a degree below the pressures required for rendering them effective, and said selector means being operative upon a reduction in pressure in said control pipe to a degree below said certain pressure to select said reverse directional control means to determine the direction of vehicle movement.

19. A system for selectively controlling a high gear drive means, a low gear drive means, a forward directional control means, and a reverse directional control means all located in the power transmitting connection between an engine and a drive axle of a vehicle, each of said means being effective upon the application of pressure thereto and ineffective upon the release of such pressure, said system comprising a control pipe, a device having a pressure passage, actuating pipes connecting said forward and reverse control means to said device, a valve controlling communication between said pressure passage and actuating pipes and having a plurality of equally spaced pressure ports in constant communication with said pressure passage and so arranged as to alternately connect said passage first with one of said actuating pipes and then with the other upon certain increments of rotation of said valve, said valve also having a plurality of non-pressure ports alternated with said pressure ports and adapted to either register with one or the other of said actuating pipes whichever is disconnected from said pressure ports, means controlled by the pressure of fluid in said control pipe and operative upon an increase therein to a certain degree and a subsequent reduction in such pressure to turn said valve to a position for connecting one of said actuating pipes to one of said pressure ports and the other actuating pipe to one of said non-pressure ports and operative upon another increase in pressure in said pipe to said certain degree followed by a reduction in such pressure to reverse the connections between said actuating pipes and said pressure and non-pressure ports, means operative upon an increase in pressure in said control pipe to a chosen degree exceeding said certain degree to supply fluid under pressure to said supply passage and to said low gear drive means, other means operative upon an increase in pressure in said control pipe to a still higher chosen degree to render said low gear drive means ineffective and to then supply fluid under pressure to said pressure passage and to said high gear drive means, and a manually operative device movable to different positions to provide the different degrees of fluid pressure in said control pipe required for controlling said high and low gear drive means and said forward and reverse directional control means.

20. In combination, high and low speed devices selectively operative to transmit power from an internal combustion engine to a drive axle of a vehicle, fluid controlled throttle adjusting means for controlling the power of said engine and movable to an engine idling position when void of fluid under pressure and from said idling position to other positions dependent upon the pressure of fluid therein for providing various degrees of power or speed of said engine, a manual throttle control valve operative to vary the pressure of fluid in said throttle adjusting means, a manual controller for controlling said high and low speed devices and having one position for rendering said low speed device effective and movable from said one position to another position for rendering said high speed device effective, and means associated with said manual controller and operative automatically upon movement thereof between its different positions to vent fluid under pressure from said throttle adjusting means, the last named means providing for the control of the fluid in said adjusting means by said throttle control valve only when said manual controller is in its two positions.

21. In combination, a high and low speed device selectively operative for transmitting power from an internal combustion engine to a drive axle of the vehicle, a manual controller for controlling said high and low speed devices and having one position for effecting operation thereof to disconnect said engine from said axle, said manual controller being movable from said one position to a second position for rendering said low speed device effective and to a third position for rendering said high speed device effective, a throttle cylinder for controlling the speed or power of said engine and operative when void of fluid under pressure to provide an idling speed of said engine and when supplied with fluid under pressure to vary the power or speed of said engine in accordance with the degree of pressure of such fluid, a manually operative throttle control valve for varying the pressure of fluid in said throttle cylinder, means associated with said manual controller rendering said throttle valve effective to vary the pressure in said throttle cylinder when said controller is in any one of its positions and operative to vent fluid under pressure from said throttle cylinder upon movement of said controller between each of its different positions, and means operative subsequent to the venting of fluid under pressure from said throttle cylinder by operation of said manual controller in moving from one position to another to delay the resupply of fluid under pressure thereto from said throttle control valve.

22. In combination, a selective gear transmission device operative to provide various drive connections between an internal combustion engine and the drive axle of a vehicle, a fluid pressure controlled throttle cylinder for governing the throttle position on said engine and movable to an idling position when void of fluid under pressure to provide for operation of said engine at an idling speed and movable from said idling position to various other positions depending upon the pressure of fluid supplied thereto to provide various degrees of power or speed of said engine, a manually operative throttle control valve movable to various positions to provide different degrees of pressure in said throttle cylinder, a manually operative controller movable to different positions for selectively controlling the gear drive in said transmission device, an interlock valve controlling communication through which fluid under pressure is supplied to said throttle cylinder from said throttle control valve and having a normal position opening same and movable to another position for closing said communication, and for venting the fluid under pressure from said throttle cylinder, and means associated with said manual controller controlling said interlock valve and operative upon movement of said controller between its different positions to effect operation of said interlock valve to vent fluid under pressure from said cylinder and in its different positions providing for operation of said interlock valve to open said communication between said cylinder and said throttle control valve, and means for delaying the operation of said interlock valve to open the communication controlled thereby subsequent to the closing of said communication by the operation of said manual controller.

23. In combination, a selective high and low speed gear transmission device for providing various drive connections between an internal combustion engine and an axle of a vehicle, a fluid controlled throttle cylinder for controlling the speed or power of said engine and having an idling position to provide for operation of said engine at idling speed and movable therefrom to a plurality of different positions depending upon the pressure of fluid in said cylinder to provide various degrees of speed or power of said engine, a throttle control valve operative manually to vary the pressure of fluid in said cylinder, an interlock valve device controlling communication between said cylinder and throttle control valve and having a normal position opening said communication and another position for closing such communication and for venting said throttle cylinder to the atmosphere, said interlock valve device comprising a movable abutment subject on one side to the pressure of fluid supplied by said throttle control device and on the opposite side to pressure of fluid in a chamber supplied with fluid under pressure from said throttle control device at a restricted rate, a spring in said chamber acting on said abutment for urging same to a position for opening said communication when the pressure of fluid on the opposite sides of said abutment are substantially equal, said abutment being operative upon the venting of fluid under pressure from said chamber to effect closure of said communication, a manual controller movable to one operating position to render said low speed gear device effective and to another operating position to render said high speed gear device effective, a valve in said manual controller operative to vent fluid under pressure from said chamber, and means operative upon movement of said manual controller between said operating positions to actuate said valve, the last named means providing for closure of said valve when said manual controller is in any of said operating positions.

24. In combination, a selective high and low speed gear transmission device for providing various drive connections between an internal combustion engine and an axle of a vehicle, a fluid controlled throttle cylinder for controlling the speed or power of said engine and having an idling position to provide for operation of said engine at idling speed and movable therefrom to a plurality of different positions depending upon the pressure of fluid in said cylinder to provide various degrees of speed or power of said engine, a throttle control valve operative manually to vary the pressure of fluid in said cylinder, an interlock valve device controlling communication between said cylinder and throttle control valve and having a normal position opening said communication and another position for closing such communication and for venting said throttle cylinder to the atmosphere, said interlock valve device comprising a movable abutment subject on one side to the pressure of fluid supplied by said throttle control device and on the opposite side to pressure of fluid in a chamber supplied with fluid under pressure from said throttle control device at a restricted rate, a spring in said chamber acting on said abutment for urging same to a position for opening said communication when the pressure of fluid on the opposite sides of said abutment are substantially equal, said abutment being operative upon the venting of fluid under pressure from said chamber to effect closure of said communication, a manual controller for selectively controlling said high and low speed gear and comprising a handle having a normal position for rendering both of said gears ineffective and being movable therefrom to another position for rendering said low speed gear effective and to still another position for rendering said high speed gear effective a valve in said manual controller operative when unseated to vent fluid under pressure from said chamber, and means associated with said manual controller operative by said handle upon movement thereof between its different positions to unseat said valve, the last named means providing for the seating of said valve when said handle is in its different position.

25. In combination, a selective high and low speed gear transmission device for providing various drive connections between an internal combustion engine and an axle of a vehicle, a fluid controlled throttle cylinder for controlling the speed or power of said engine and having an idling position to provide for operation of said engine at idling speed and movable therefrom to a pluurality of different positions depending upon the pressure of fluid in said cylinder to provide various degrees of speed or power of said engine, a throttle control valve operative manually to vary the pressure of fluid in said cylinder, an interlock valve device controlling communication between said cylinder and throttle control valve and having a normal position opening said communication and another position for closing such communication and for venting said throttle cylinder to the atmosphere, said interlock valve device comprising a movable abutment subject on one side to the pressure of fluid supplied by said throttle control device and on the opposite side to pressure of fluid in a chamber supplied with fluid under pressure from said throttle control device at a restricted rate, a spring in said chamber acting on said abutment for urging same to a position for opening said communication when the pressure of fluid on the opposite sides of said abutment are substantially equal, said abutment being operative upon the venting of fluid under pressure from said chamber to effect closure of said communication, a manual controller for controlling said high and low speed gears and comprising a handle rotatable manually in a certain plane, said handle having one position for rendering both of said speed gears ineffective and being movable therefrom to another position for rendering said low speed gear effective and to still a third position for rendering said high speed gear effective, a valve associated with said manual controller operable when unseated to vent fluid under pressure from said chamber, and an element engageable by said handle during movement between its different positions for unseating said valve, said element providing for the seating of said valve when said handle is in its different position.

26. A manually operative control device comprising a casing, a handle mounted thereon and adapted to be turned relatively to said casing in a certain plane to different operating positions, a rigid substantially semi-circular element hinged to said casing for rocking movement in a direction at right angles to said plane, said element having raised parts engageable by said handle upon movement between its different positions for effecting rocking of said element from said normal position, said element having recesses between said raised parts providing for return of said element to its normal position in each of said handle positions, and means for urging said element to said normal position.

27. A control apparatus for selectively controlling two different drive connections between a prime mover and a member to be driven by said prime mover comprising a control pipe, means subject to pressure of fluid in said pipe and operative upon establishment of a certain degree of fluid pressure in said pipe to provide one of said drive connections and upon a lesser degree of pressure to break said one drive connection, other means subject to pressure of fluid in said pipe and operative upon establishment of a certain greater degree of fluid pressure in said pipe to effect operation of the first named means to break the drive connection controlled thereby and to make the other of said drive connections and upon a lesser degree to break said other drive connection, and a manually operative device selectively operative to provide either of said degrees of fluid pressure in said pipe or a pressure lower than said lesser degree for effecting operation of both of said means to break the drive connection controlled thereby.

28. A fluid pressure control mechanism for alternating the operation of a plurality of fluid pressure responsive devices comprising a casing having a passage in which the pressure of fluid is adapted to be varied for controlling said devices, a valve in said casing having positions corresponding in number to the number of said devices and operative upon movement first to one and then to another of said positions to connect said passage first to one of said devices and then another for alternately rendering the connected device controllable from said passage and for rendering the disconnected device non-operable, means operable upon a variation in fluid pressure to move said valve from one of its positions to another, and manually operable means for effecting variations in fluid pressure on said means.

29. An apparatus for controlling the operation of a clutch arranged to connect and disconnect a prime mover to and from a member to be driven and for also controlling the power output of said prime mover comprising, in combination, means operable upon supply of fluid under pressure to a clutch control pipe to effect engagement of said clutch and upon release of fluid under pressure from said pipe to effect disengagement of said clutch, clutch control means operable to effect a supply of fluid under pressure to and its release from said pipe, a motor operable by fluid under pressure to adjust the power output of said prime mover in proportion to the pressure of fluid in said motor and to provide for a chosen reduced output of said prime mover when the pressure in said motor is substantially atmospheric pressure, motor control means operable to vary the fluid pressure in said motor, and means operable upon operation of said clutch control means to release fluid under pressure from said clutch control pipe to reduce the pressure in said motor to substantially atmospheric pressure.

30. An apparatus for controlling the operation of a clutch arranged to connect and disconnect a prime mover to and from a member to be driven and for also controlling the power output of said prime mover comprising, in combination, means operable upon supply of fluid under pressure to a clutch control pipe to effect engagement of said clutch and upon release of fluid under pressure from said pipe to effect disengagement of said clutch, clutch control means operable to effect a supply of fluid under pressure to and its release from said pipe, a motor operable by fluid under pressure to adjust the power output of said prime mover in proportion to the pressure of fluid in said motor and to provide for a chosen reduced output of said prime mover when the pressure in said motor is substantially atmospheric pressure, motor control means operable to vary the fluid pressure in said motor, and a valve device controlling communication through which the pressure of fluid is varied in said motor by said motor control means and operable upon operation of said clutch control means to release fluid under pressure from said clutch control pipe, to close said communication and open said motor to the atmosphere.

31. An apparatus for controlling the operation of a clutch arranged to connect and disconnect a prime mover to and from a member to be driven and for also controlling the power output of said prime mover comprising, in combination, means operable upon supply of fluid under pressure to a clutch control pipe to effect engagement of said clutch and upon release of fluid under pressure from said pipe to effect disengagement of said clutch, clutch control means operable to effect a supply of fluid under pressure to and its release from said pipe, a motor operable by fluid under pressure to adjust the power output of said prime mover in proportion to the pressure of fluid in said motor and to provide for a chosen reduced output of said prime mover when the pressure in said motor is substantially atmospheric pressure, and means associated with said clutch control means providing for opening of said motor to atmosphere upon operation of said clutch control means to release fluid under pressure from said clutch control pipe and providing for varying the pressure of fluid in said motor subsequent to supply of fluid under pressure to said pipe.

32. An apparatus for controlling the operation of clutch means arranged to connect a prime mover to a member to be driven to provide for movement of said member in either one direction or the opposite direction and for also controlling the power output of said prime mover, said apparatus comprising, in combination, clutch control means operable upon release of fluid under pressure from one pipe and supply of fluid under pressure to another pipe to actuate said clutch means to connect said prime mover and member to provide for movement of said member in said one direction and operable upon release of fluid under pressure from said other pipe and supply of fluid under pressure to said one pipe to actuate said clutch means to connect said prime mover and member to provide for movement of said member in said opposite direction, manually controlled means movable to a certain position to effect the supply of fluid under pressure to one of said pipes and the release of fluid under pressure from the other pipe and to a different position to effect the supply of fluid under pressure to said other pipe and the release of fluid under pressure from said one pipe, a motor operable by fluid under pressure to vary the power output of said prime mover in proportion to the pressure of fluid in said motor and to provide a chosen reduced output when the pressure in said motor is substantially atmospheric pressure, motor control means operable to vary the pressure of fluid in said motor, and means operable upon movement of said manually controlled means out of either one of said positions to reduce the pressure in said motor to substantially atmospheric pressure and upon movement into either of said positions to provide for varying the pressure in said motor by operation of said motor control means.

33. An apparatus for controlling the operation of clutch means arranged to connect a prime mover to a member to be driven to provide for movement of said member in either one direction or the opposite direction and for also controlling the power output of said prime mover, said apparatus comprising, in combination, clutch control means operable upon release of fluid under pressure from one pipe and supply of fluid under pressure to another pipe to actuate said clutch means to connect said prime mover and member to provide for movement of said member in said one direction and operable upon release of fluid under pressure from said other pipe and supply of fluid under pressure to said one pipe to actuate said clutch means to connect said prime mover and member to provide for movement of said member in said opposite direction, manually controlled means movable to a certain position to effect the supply of fluid under pressure to one of said pipes and the release of fluid under pressure from the other pipe and to a different position to effect the supply of fluid under pressure to said other pipe and the release of fluid under pressure from said one pipe, a motor operable by fluid under pressure to vary the power output of said prime mover in proportion to the pressure of fluid in said motor and to provide a chosen reduced output when the pressure in said motor is substantially atmospheric pressure, motor control means operable to vary the pressure of fluid in said motor, and means operable upon release of fluid under pressure from either of said pipes to reduce the pressure in said motor to substantially atmospheric pressure and providing for an increase in such pressure to the degree provided by said motor control means upon subsequent supply of fluid under pressure to the other pipe.

34. An apparatus for controlling the operation of clutch means arranged to connect a prime mover to a member to be driven to provide for movement of said member in either one direction or the opposite direction and for also controlling the power output of said prime mover, said apparatus comprising, in combination, clutch control means operable upon release of fluid under pressure from one pipe and supply of fluid under pressure to another pipe to actuate said clutch means to connect said prime mover and member to provide for movement of said member in said one direction and operable upon release of fluid under pressure from said other pipe and supply of fluid under pressure to said one pipe to actuate said clutch means to connect said prime mover and member to provide for movement of said member in said opposite direction, manually controlled means movable to a certain position to effect the supply of fluid under pressure to one of said pipes and the release of fluid under pressure from the other pipe and to a different position to effect the supply of fluid under pressure to said other pipe and the release of fluid under pressure from said one pipe, a motor operable by fluid under presssure to vary the power output of said prime mover in proportion to the pressure of fluid in said motor and to provide a chosen reduced output when the pressure in said motor is substantially atmospheric pressure, motor control means operable to vary the pressure of fluid in said motor, a valve device controlling communication through which fluid under pressure is supplied from said motor control means to said motor and operable upon operation of said manually controlled means to release fluid under pressure from either one of said pipes to reduce the pressure in said motor to substantially atmospheric pressure and upon the subsequent supply of fluid under pressure to the other pipe to effect an increase in pressure in said motor to the degree provided by said motor control means.

35. An apparatus for controlling the operation of clutch means arranged to connect a prime mover to a member to be driven to provide for movement of said member in either one direction or the opposite direction and for also controlling the power output of said prime mover, said apparatus comprising, in combination, clutch control means operable upon release of fluid under pressure from one pipe and supply of fluid under pressure to another pipe to actuate said clutch means to connect said prime mover and member to provide for movement of said member in said one direction and operable upon release of fluid under pressure from said other pipe and supply of fluid under pressure to said one pipe to actuate said clutch means to connect said prime mover and member to provide for movement of said member in said opposite direction, manually controlled means movable to a certain position to effect the supply of fluid under pressure to one of said pipes and the release of fluid under pressure from the other pipe and to a different position to effect the supply of fluid under pressure to said other pipe and the release of fluid under pressure from said one pipe, a motor operable by fluid under pressure to vary the power output of said prime mover in proportion to the pressure of fluid in said motor and to provide a chosen reduced output when the pressure in said motor is substantially atmospheric pressure, motor control means operable to vary the pressure of fluid in said motor, and means operable upon operation of said manually controlled means to effect a release of fluid under pressure from either of said pipes to disconnect said motor from said motor control means and to open said motor to atmosphere and upon subsequent operation of said manually controlled means to supply fluid under pressure to either of said pipes to connect said motor to said motor control means for control thereby.

36. An apparatus for controlling the operation of a clutch arranged to connect and disconnect a prime mover to and from a member to be driven and for also controlling the power output of said prime mover comprising, in combination, clutch control means operable upon supply of fluid under pressure to a pipe to effect engagement of said clutch and upon release of fluid under pressure from said pipe disengagement of said clutch, a motor operable by fluid under pressure to adjust the power output of said prime mover in proportion to the pressure of fluid acting in said motor and to provide for a chosen reduced output of said motor when such pressure is substantially atmospheric pressure, and manual control means for said clutch control means and motor so constructed and arranged as to provide for varying the pressure of fluid in said motor upon supply of fluid under pressure to said pipe and operable to effect opening of said motor to atmosphere upon operation to release fluid under pressure from said pipe.

37. An apparatus for controlling the operation of a clutch arranged to connect and disconnect a prime mover to and from a member to be driven and for also controlling the power output of said prime mover comprising, in combination, clutch control means operable upon supply of fluid under pressure to a pipe to effect engagement of said clutch and upon release of fluid under pressure from said pipe disengagement of said clutch, a motor operable by fluid under pressure to adjust the power output of said prime mover in proportion to the pressure of fluid acting in said motor and to provide for a chosen reduced output of said motor when such pressure is substantially atmospheric pressure, and manual control means for said clutch control means and motor having a clutch engaging position for effecting a supply of fluid under pressure to said pipe and a second position for effecting a release of fluid under pressure from said pipe and operative in the clutch engaging position to provide for varying the pressure of fluid in said motor and upon movement out of same to said second position to effect opening of said motor to atmosphere.

38. An apparatus for controlling the operation of a clutch arranged to connect and disconnect a prime mover to and from a member to be driven and for also controlling the power output of said prime mover comprising, in combination, clutch control means operable upon supply of fluid under pressure to a pipe to effect engagement of said clutch and upon release of fluid under pressure from said pipe disengagement of said clutch, a motor operable by fluid under pressure to adjust the power output of said prime mover in proportion to the pressure of fluid acting in said motor and to provide for a chosen reduced output of said motor when such pressure is substantially atmospheric pressure, and manual control means for said clutch control means and motor having a clutch engaging position for effecting a supply of fluid under pressure to said pipe and movable out of said position for effecting a release of fluid under pressure from said pipe and so constructed and arranged as to effect reducing of the pressure of fluid in said motor to substantially atmospheric pressure upon movement out of said position and to provide for varying the pressure in said motor only subsequent to movement to said position.

39. An apparatus for controlling the operation of a clutch arranged to connect and disconnect a prime mover to and from a member to be driven and for also controlling the adjustment of an element for varying the power output of said prime mover from a chosen low degree to a chosen high degree, comprising in combination with said clutch and element, manually controlled means operable to effect engagement and disengagement of said clutch, and means associated with said manually controlled means and operable upon operation thereof to effect disengagement of said clutch to actuate said element to reduce the power output of said engine to said low degree and upon operation to effect engagement of said clutch to provide for adjustment of said element to increase the power output of said prime mover.

40. An apparatus for controlling the operation of a clutch arranged to connect and disconnect a prime mover to and from a member to be driven and for also controlling the pressure of fluid in a cylinder which is operative to vary the output of said prime mover in accordance with the degree of such pressure and which provides for operation of said prime mover at an idling speed upon opening said cylinder to atmosphere, said apparatus comprising in combination with said clutch and cylinder, manually controlled means operable to effect engagement and disengagement of said clutch and means associated with said manually controlled means and so constructed and arranged as to effect opening of said cylinder to atmosphere upon operation of said manually controlled means to disengage said clutch and to provide for varying the pressure of fluid in said cylinder only subsequent to operation of said manually controlled means to effect engagement of said clutch.

41. An arrangement for controlling the operation of clutch means to connect and disconnect a prime mover to and from a member to be driven and for also controlling the power output of said prime mover comprising in combination, clutch control means operable by fluid under pressure to effect engagement of said clutch means and upon release of fluid under pressure disengagement of said clutch means, power control means adjustable by variations in fluid pressure to vary the output of said prime mover in proportion to the pressure of the adjusting fluid and to provide a chosen reduced output of said prime mover when subject to a chosen reduced fluid pressure, and manually controlled means operative to effect the supply of fluid under pressure to and the release of fluid under pressure from said clutch control means, said manually controlled means including means for controlling said power means and so arranged as to effect subjection of said power control means to said reduced pressure upon release of fluid under pressure from said clutch control means and to provide for said variations in fluid pressure on said power control means subsequent to supply of fluid under pressure to said clutch control means.

42. An arrangement for controlling the operation of clutch means to connect and disconnect a prime mover to and from a member to be driven and for also controlling the power output of said prime mover comprising in combination, clutch control means operable by fluid under pressure to effect engagement of said clutch means and upon release of fluid under pressure disengagement of said clutch means, power control means adjustable by variations in fluid pressure to vary the output of said prime mover in proportion to the pressure of the adjusting fluid and to provide a chosen reduced output of said prime mover when subject to a chosen reduced fluid pressure, manually controlled means operative to control the supply of fluid under pressure to and the release of fluid under pressure from said clutch control means and power control means and so designed and arranged as to subject said power means to said reduced pressure upon operation of said manually controlled means to release fluid under pressure from said clutch control means, and to provide for said variations in fluid pressure on said power control means subsequent to supply of fluid under pressure to said clutch control means by operation of said manually controlled means.

43. An arrangement for controlling a clutch and fuel supply control member of an internal combustion engine, said member having an engine idling position and being movable therefrom to increase the speed of said engine, said arrangement comprising in combination with said clutch and member, a manual control device having one position for rendering said clutch effective and another position for rendering said clutch ineffective, and means associated with said device for controlling said member and operative upon movement of said device from its first named position to its second named position to effect movement of said member to said engine idling position and upon movement of said device to its first named position to provide for movement of said member out of idling position for increasing the speed of said engine.

44. An apparatus for controlling the operation of a clutch arranged to connect and disconnect a prime mover to and from a member to be driven and for also controlling the adjustment of an element for varying the power output of said prime mover from a chosen low degree to a chosen high degree, comprising in combination with said clutch and element, manually controlled means operable to effect engagement and disengagement of said clutch, and means associated with said manually controlled means and operable upon operation thereof to effect disengagement of said clutch to effect operation of said element to reduce the power output of said engine to said low degree and upon operation to effect engagement of said clutch to provide for adjustment of said element to increase the power output of said prime mover.

45. An apparatus for controlling the operation of a clutch arranged to connect and disconnect a prime mover to and from a member to be driven and for also controlling the adjustment of an element for varying the power output of said prime mover from a chosen low degree to a chosen high degree, comprising in combination with said clutch and element, manually controlled means operable to effect engagement and disengagement of said clutch, and means operable upon operation of said manually controlled means to effect disengagement of said clutch to effect operation of said element to reduce the power output of said engine to said low degree and upon operation to effect engagement of said clutch to provide for adjustment of said element to increase the power output of said prime mover.

BURTON S. AIKMAN.